(12) United States Patent
Wu et al.

(10) Patent No.: US 12,521,205 B2
(45) Date of Patent: Jan. 13, 2026

(54) PREPARATION GUIDE PLATE AND REMOVABLE PARTIAL DENTURE SUPPORT MODEL CONSTRUCTION METHOD AND FABRICATION METHOD

(71) Applicant: THE FOURTH MILITARY MEDICAL UNIVERSITY, Shaanxi (CN)

(72) Inventors: Jiang Wu, Shaanxi (CN); Xianghui Zhao, Shaanxi (CN); Bo Gao, Shaanxi (CN)

(73) Assignee: THE FOURTH MILITARY MEDICAL UNIVERSITY, Shaanxi (CN)

( * ) Notice: Subject to any disclaimer, the term of this patent is extended or adjusted under 35 U.S.C. 154(b) by 543 days.

(21) Appl. No.: 18/193,654

(22) Filed: Mar. 31, 2023

(65) Prior Publication Data

US 2023/0346511 A1     Nov. 2, 2023

Related U.S. Application Data

(63) Continuation of application No. PCT/CN2021/137569, filed on Dec. 13, 2021.

(30) Foreign Application Priority Data

Sep. 14, 2021    (CN) .......................... 202111072778.X

(51) Int. Cl.
    *A61C 8/00*           (2006.01)
    *A61C 1/08*           (2006.01)
    (Continued)

(52) U.S. Cl.
    CPC ............ *A61C 1/084* (2013.01); *A61C 8/0089* (2013.01); *A61C 13/34* (2013.01)

(58) Field of Classification Search
    CPC ....... A61C 1/084; A61C 8/0089; A61C 13/34; A61C 1/082; A61C 13/26; A61C 8/00; A61C 13/267; A61C 13/0004
    See application file for complete search history.

(56) References Cited

U.S. PATENT DOCUMENTS

RE49,487 E * 4/2023 Kwon .................... A61C 13/12
                                                    433/75
2012/0143364 A1* 6/2012 Mcleod ..................... A61C 5/77
                                                    700/98

(Continued)

FOREIGN PATENT DOCUMENTS

CN          101239007 A      8/2008
CN          101828974 A      9/2010
(Continued)

OTHER PUBLICATIONS

International Search Report dated Jun. 13, 2022 in International Application No. PPCT/CN2021/137569. English translation attached.
(Continued)

*Primary Examiner* — Thomas C Lee
*Assistant Examiner* — Michael V Farina

(57) ABSTRACT

The present disclosure discloses a method for constructing and fabricating a preparation guide plate and a removable partial denture bracket model. The method includes: simulating implant placement in CBCT data of an oral cavity, and determining an implant placement site and an implant placement direction; in oral scan data, generating a simulated implant and marking a direction of an insertion path for a removable partial denture, the direction of the insertion path being consistent with the implant placement direction; marking a guide plane of an inner side of an adjacent tooth at an inner side of an adjacent tooth of the oral scan data based on the direction of the insertion path; and generating the preparation guide plate model based on an edentulous (Continued)

region, the adjacent tooth, and the guide plane of the inner side of the adjacent tooth in the oral scan data and a region to be removed.

12 Claims, 5 Drawing Sheets

(51) Int. Cl.
*A61C 13/267* (2006.01)
*A61C 13/34* (2006.01)

(56) References Cited

U.S. PATENT DOCUMENTS

| 2020/0205947 | A1 | 7/2020 | Grobbee et al. |
| 2023/0181294 | A1* | 6/2023 | Wang ............... A61C 1/084 433/173 |

FOREIGN PATENT DOCUMENTS

| CN | 107224335 A | 10/2017 |
| CN | 109223217 A | 1/2019 |
| CN | 110478037 A | 11/2019 |
| CN | 111544136 A | 8/2020 |
| CN | 111658205 A | 9/2020 |
| CN | 112932706 A | 6/2021 |
| CN | 112972027 A | 6/2021 |
| CN | 216455394 U | 5/2022 |
| KR | 101594497 B1 | 2/2016 |

OTHER PUBLICATIONS

First Office Action from corresponding Chinese Application No. 202111072778.X, dated Apr. 24, 2022. English translation attached.
The Grant Notice from corresponding Chinese Application No. 202111072778.X, dated May 25, 2022. English translation attached.
International Search Report dated Jun. 13, 2022 in International Application No. PCT/CN2021/137569. English translation attached.

* cited by examiner a	b a          b a b c d e f

PREPARATION GUIDE PLATE AND REMOVABLE PARTIAL DENTURE SUPPORT MODEL CONSTRUCTION METHOD AND FABRICATION METHOD

CROSS-REFERENCE TO RELATED APPLICATIONS

This application claims a priority to Patent Application No. CN202111072778X filed on Sep. 14, 2021, the entire disclosure of which is incorporated herein by reference.

FIELD

The present disclosure relates to the technical field of oral digitization, and in particular, to a method for constructing a preparation guide plate, a method for fabricating a preparation guide plate, a method for constructing a removable partial denture bracket model, and a method for fabricating a removable partial denture bracket model.

BACKGROUND

In the field of oral medicine, dentition defect is one of the most common oral diseases. A fixed bridge denture, a removable partial denture, or an implant denture is usually used for repair. For the fixed bridge denture, a large amount of healthy dental tissues needs to be removed, so a patient has a low acceptability for the fixed bridge denture. The removable partial denture is widely applied because of advantages like low in cost, minimally invasive. However, due to structural characteristics of the removable partial denture, a snap ring, a support, and the like are required to be designed on the remaining teeth, to improve overall retention and stabilization effects. Therefore, the remaining teeth are easily subjected to great stress during use, thereby affecting health of the remaining teeth. Moreover, for a patient group with much agomphiasis, because of poor remaining tooth conditions, the removable partial denture often cannot be well retained and stabilized, thereby greatly weakening its usage effect.

In view of the above, for a patient with much agomphiasis, it may be considered that a small amount of implants (1 to 2 implants) is placed in an edentulous region, then a metal bracket-type removable partial denture (which is composed of a removable denture bracket and an edentulous-region artificial tooth) is fabricated, and the removable partial denture is fixed to an upper portion of the implant by forming a stable combination of a yang structure of the upper abutment (mainly divided into a magnet, a locator, a snap, etc.) of the implant and a yin structure of an abutment in a reserved space of a base region of the removable partial denture. In this way, the removable partial denture obtains good stability and retention through the abutment structure and ensures an effective enablement function of the denture. Meanwhile, the implant also provides good support, which slows down the alveolar bone resorption. The removable partial denture considers advantages of good retention effects of the implant and moderate prices of the removable partial denture, and is also referred to as an implant-supported removable partial denture clinically.

Currently, a preparation guide plate is clinically used for performing implant placement. Therefore, it is ensured that the implant socket preparation is performed based on the pre-design, and avoids important blood vessels and nerves in the alveolar bone to prevent damage. The fabricating method is typically used to fabricate a manual simple guide plate and a digital-designed/fabricated guide plate.

However, during actual use, it was found that when the bracket-type removable partial denture is fabricated, a guide plane should first be prepared on the remaining natural teeth; and because of lack of actual reference, a doctor can only complete grinding of the guide plane or placement of the implant according to a two-dimensional image or an approximate impression, resulting in a difference between a direction of an insertion path for the bracket-type removable partial denture and the implant placement direction. After a period of use, the removable denture has a component of a base surface thereof that is connected to the abutment of the implant and seriously worn, which seriously affects a retention effect of the removable partial denture. Meanwhile, the implant is subjected to a large lateral force because a removal direction (an insertion direction) of the denture is inconsistent with the implant placement direction in a long-term removing and inserting process of the removable partial denture, resulting in bone resorption around the implant.

SUMMARY

In view of the defects or deficiencies in the related art, according to one embodiment of the present disclosure, a method for constructing a preparation guide plate model is provided.

To this end, according to the present disclosure, the method for constructing the preparation guide plate model includes:

step 1: simulating implant placement in CBCT data of an oral cavity having an edentulous region, and determining an implant placement site and an implant placement direction, to obtain CBCT data including the implant placement site and being marked with the implant placement direction;

step 2: in oral scan data of the oral cavity having the edentulous region, generating a simulated implant and marking a direction of an insertion path for a removable partial denture based on the implant placement site and the implant placement direction that are obtained in step 1, the direction of the insertion path being consistent with the implant placement direction;

step 3: in the oral scan data that has been processed in step 2, taking a plane where the direction of the insertion path is located and which is tangent to an inner side of an adjacent tooth as a reference guide plane, translating the reference guide plane to a portion close to the inner side of the adjacent tooth and inserting the reference guide plane into the adjacent tooth without changing a direction of the reference guide plane, to form an intersection plane of the reference guide plane and the adjacent tooth, where adjacent tooth local data is stored on a side of the intersection plane close to the edentulous region, the adjacent tooth local data is a region to be removed, and the intersection plane forms a guide plane of the inner side of the adjacent tooth; and when a plurality of adjacent teeth is present, the plurality of adjacent teeth is successively processed to form a corresponding guide plane on an inner side of each of the plurality of adjacent teeth; and step 4: generating the preparation guide plate model based on the oral scan data that has been processed in step 3, where the preparation guide plate model includes a structure covering the edentulous region and a structure covering the adjacent tooth, where a thickness of a structure covering the region to be removed on the structure covering the adjacent tooth is smaller than a thickness of a structure covering a remaining region of the same adjacent tooth, a thickness gap surface between the structure covering the region to be removed and the structure covering the remaining region of the same adjacent tooth covers a local portion of the guide plate plane of the inner side of the adjacent tooth, and the thickness gap surface is a plane structure having a same direction as a direction of the guide plate plane of the inner side of the adjacent tooth.

In some embodiments, the preparation guide plate model further defines an implant reserve hole, an opening orientation of the implant reserve hole being consistent with the implant placement direction.

In some embodiments, an arch-shaped step structure is defined between the structure covering the region to be removed and the structure covering the remaining region of the same adjacent tooth.

In some embodiments, the preparation guide plate model includes 2 to 4 teeth covering one side or two sides of the edentulous region and including the adjacent tooth.

In some embodiments, an observation hole is defined in the preparation guide plate model.

The present disclosure further provides a method for fabricating a preparation guide plate. To this end, according to the present disclosure, the method for fabricating the preparation guide plate includes: constructing a preparation guide plate model by using the method as described above; and fabricating the preparation guide plate by using a 3D printing method based on the constructed preparation guide plate model, a material used in the 3D printing method being a resin material.

According to one embodiment of the present disclosure, a method for constructing a removable partial denture bracket model, used in combination with the preparation guide plate as described above, is provided.

To this end, the provided method for constructing the removable partial denture bracket model includes: generating the removable partial denture bracket model based on the oral scan data that has been processed in step 3, where the removable partial denture bracket model includes a snap ring attached to a natural tooth and a structure covering the edentulous region and the guide plane of the inner side of the adjacent tooth, and the structure covering the guide plane of the inner side of the adjacent tooth is the plane structure having the same direction as the direction of the guide plane of the inner side of the adjacent tooth as described in step 3.

Further, provided is a method for fabricating a removable partial denture bracket, including: constructing the removable partial denture bracket model using the above-mentioned method; and fabricating the removable partial denture bracket by using a 3D printing method based on the constructed removable partial denture bracket model, a material used in the 3D printing method being metal.

An existing preparation guide plate is mainly applied in the implant placement. In addition to being applicable to the implant placement, according to the present disclosure, the preparation guide plate may also be used for preparing the guide plane before the removable partial denture is worn, thereby realizing that a digital designed and fabricated denture is smoothly worn based on a designed direction of the insertion path.

The present disclosure can be applied in the removable denture for assisting in retention of the implant, to achieve that a insertion direction is consistent with an implant direction, which prevents undesirable stress generated in a case where the insertion direction of the removable denture is inconsistent with the implant placement direction clinically in affecting osseointegration of the implant and periodontal health of the remaining natural teeth, thereby improving a success rate and a long-term use effect.

According to the present disclosure, modeling and fabrication of placement and removable partial denture are synchronously completed based on digitization technologies, which solves problems in the prior art that inconsistency between the direction of the insertion path for the removable partial denture and the implant placement direction affects a long-term retention effect of the denture and causes bone resorption of the implant.

BRIEF DESCRIPTION OF THE DRAWINGS

FIG. 5a: a sagittal view, and FIG. 5b: a coronal view;

FIG. 7a and FIG. 7b are illustrated from different angles, respectively;

FIG. 9a and FIG. 9b are schematic diagrams illustrated in different directions, respectively;

FIG. 12a shows wearing the preparation guide plate in a mouth; FIG. 12b shows grinding a preparation RPD guide plane under assistance of the preparation guide plate; FIG. 12c shows completing whole preparation of an implant socket under guidance of the preparation guide plate; FIG. 12d shows placing the implant and mounting an upper abutment; FIG. 12e shows that a position of the placed implant is consistent with the design; and FIG. 12f shows completing synchronously tooth-wearing of the removable partial denture.

DETAILED DESCRIPTION

Unless otherwise specified, the term or method herein is understood according to conventional understandings of those of ordinary skill or is implemented using existing related methods.

CBCT data refers to cone beam CT data. According to the solution of the present disclosure, Simulating implant placement may be performed using the CBCT data in implant aided design software (such as Simplant software), i.e., simulating the implant placement is performed by importing the scanned CBCT data into the Simplant software and determining a suitable implant placement site and a suitable implant placement direction based on clinical medical knowledge. In some embodiments, simulating the implant placement is performed by performing data analysis on a bone mineral density, a bone height, and a bone width in an edentulous region and preliminarily selecting a suitable implant, and the implant placement site and the implant placement direction are determined according to a position of an adjacent tooth and a position of an occlusion tooth, so as to obtain CBCT data including the implant placement site and being marked with the implant placement direction.

In oral scan data of an cavity to be repaired which has the CBCT data, according to the implant placement site and the implant placement direction determined in the CBCT data, a simulated implant is generated and a direction of an insertion path for a removable partial denture is marked, and the direction of the insertion path is consistent with the implant placement direction. The oral scan data (herein also referred to as digitized occlusion data) is data generated in oral digitized application software (such as 3Shape software) when an oral scan device is used for scanning an interior of an oral cavity to be repaired, or data generated in the oral digitized application software (for example, 3Shape software) when an impression is removed and a laboratory scan device is used for scanning data. In a specific scheme, the oral scan data may be fitted with CBCT data generating an implant and being marked with an implant direction, to obtain the fitting data generating the simulated implant and being marked with the direction of the insertion path for the removable partial denture, and the direction of the insertion path is consistent with the implant placement direction. The fitting specifically refers to importing the implant placement site and directional data determined in the CBCT data (or the Simplant software) in 3shape software.

Figure 1:
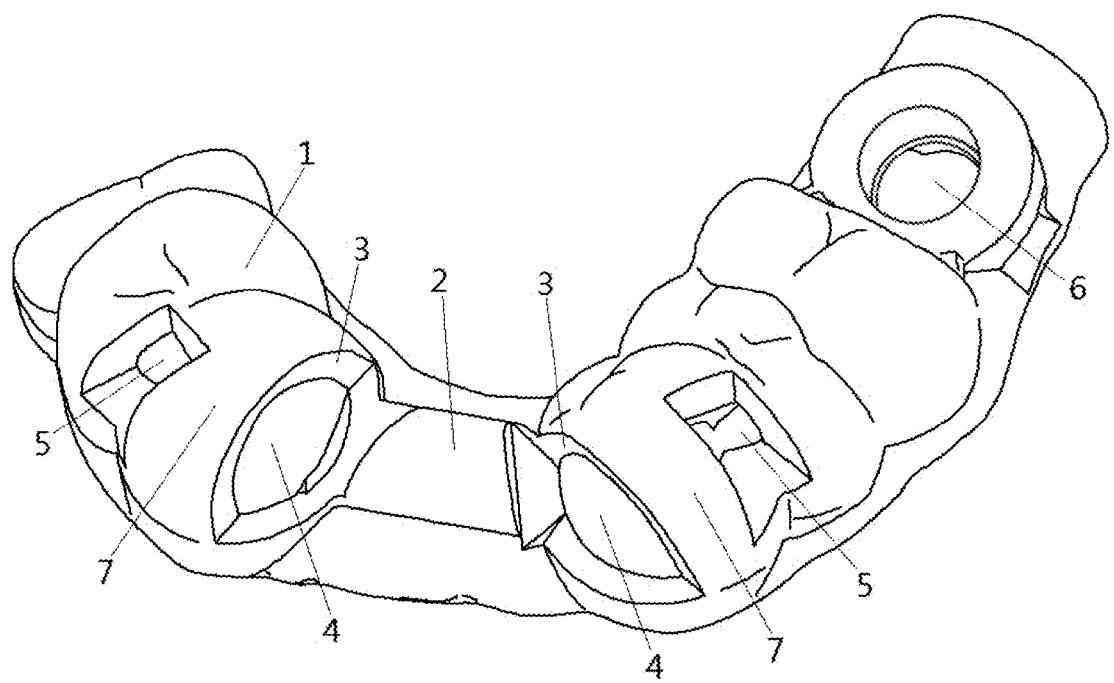
FIG. 1 is an example of a structure of a preparation guide plate fabricated according to the present disclosure.

As illustrated in FIG. 1, a structure of a preparation guide plate fabricated in the present disclosure is provided. The preparation guide plate 1 includes a structure 2 covering the edentulous region and a structure covering the adjacent tooth. A structure 4 covering a region to be removed of an inner side of the adjacent tooth is provided on the structure covering the adjacent tooth, and the rest is a structure 7 covering a remaining region of the same adjacent tooth. In addition, a thickness of a portion of the structure 4 covering the region to be removed of the inner side of the adjacent tooth is smaller than a thickness of the structure covering the remaining region of the same adjacent tooth. Thus, a thickness gap surface between the structure 7 covering the remaining region of the same adjacent tooth and the structure 4 covering the region to be removed of the inner side of the adjacent tooth is defined, i.e., a guide plane 3 of the inner side of the adjacent tooth, and the guide plane 3 of the inner side of the adjacent tooth has a same direction as a placement direction of an implant to be placed. A preparation guide plate of the structure can be used for removing preparation of a guide plane of an inner side of a natural adjacent tooth before the removable partial denture is worn, so that the corresponding denture is smoothly worn based on a designed insertion direction. The region to be removed has a thickness determined on the basis of an edentulous condition of a patient and has a requirement for grinding dental tissue which prevents the denture from being inserted, and a clinical grinding thickness is generally about 0.5 mm to 1 mm. According to the present disclosure, a layer of a thin structure is designed at the region to be removed on the preparation guide plate, which can be used for polishing and buffering during clinical use, thereby better cooperating with the guide plane of the inner side of the adjacent tooth to facilitate operation while effectively position. In a preferred scheme, an observation window 5 is provided on the preparation guide plate fabricated in the present disclosure, to facilitate observation of natural teeth or related regions during clinic operation.

Figure 2:
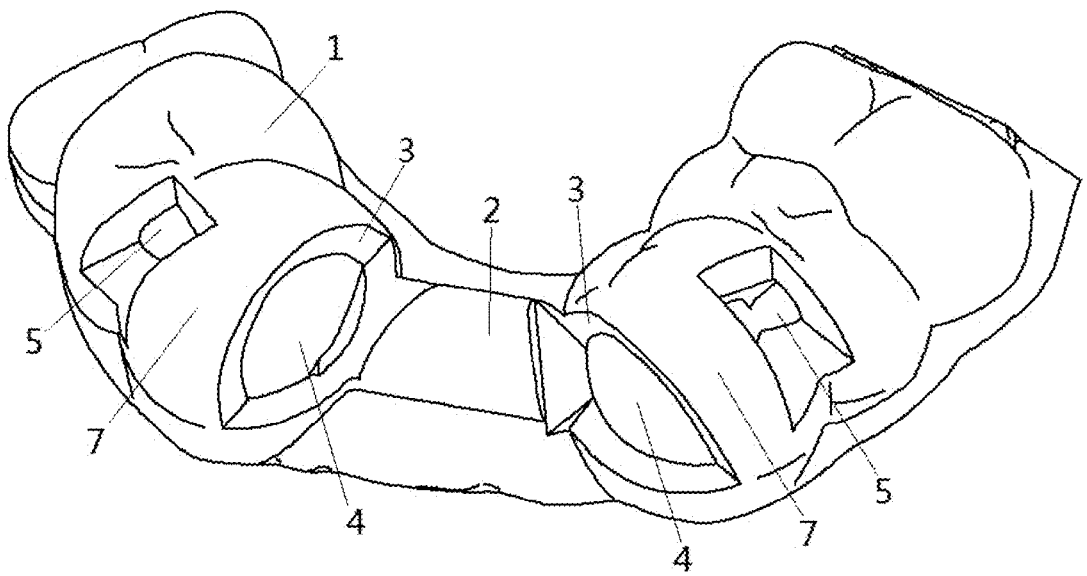
FIG. 2 is another example of a structure of a preparation guide plate fabricated according to the present disclosure.

As illustrated in FIG. 2, a preparation guide plate having another structure is provided. On the basis of a structure of the preparation guide plate illustrated in FIG. 1, the preparation guide plate further defines an implant reserve hole 6. A direction of the implant reserve hole 6 is consistent with the implant placement direction.

The adjacent tooth refers to a tooth next to the edentulous region at one side or two sides of the edentulous region. In addition to other covering structures, according to the present disclosure, the preparation guide plate covers the adjacent teeth of the edentulous region or covers two, three, or four teeth including the adjacent teeth, which is specifically determined according to occlusion and edentulous conditions in the oral cavity.

Figure 3:
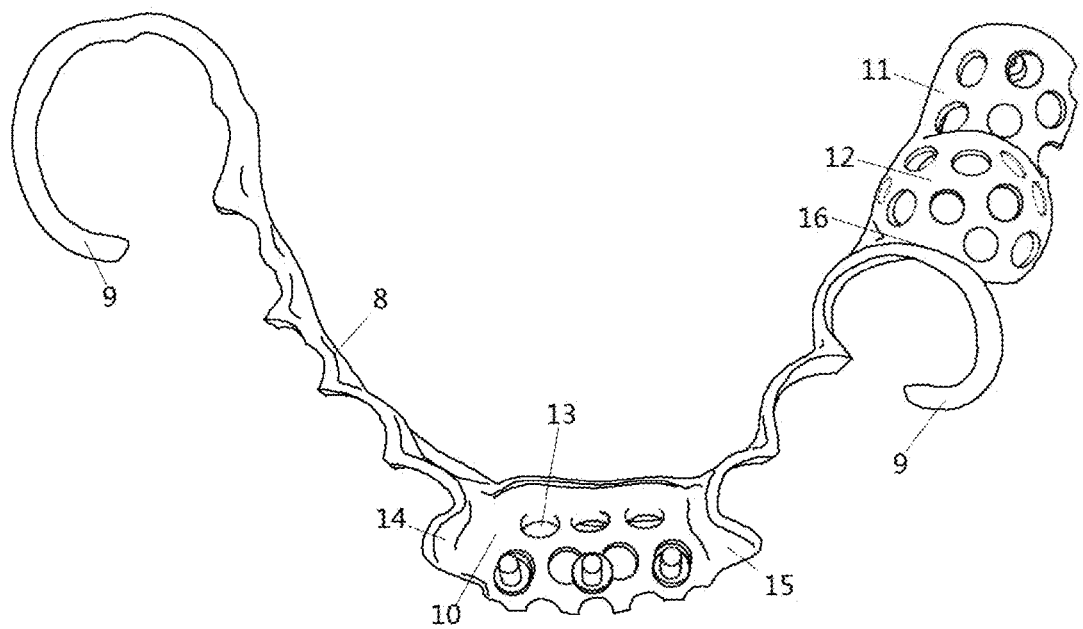
FIG. 3 is an example of a structure of a removable partial denture bracket fabricated according to the present disclosure.

As illustrated in FIG. 3, a removable partial denture bracket, used in combination with the preparation guide plate in the present disclosure, is provided. A snap ring 9 attached to a natural tooth and a structure 10 covering the edentulous region are provided on a bracket body 8. A plurality of holes 13 for fixing the denture is provided on the structure covering the edentulous region. For a preparation guide plate having the implant, a structure 12 for fixing and covering the implant and a fixing structure 11 having a rear end buried in the denture are provided on the removable partial denture bracket. Compared with the existing bracket, the bracket in the present disclosure has guide plane structures 14, 15, 16 covering the inner sides of the adjacent teeth. The removable denture fabricated using the bracket may be matched with the guide plane of the inner side of the natural adjacent tooth, which avoids abrasion and direction dislocation during wearing or removing.

The present disclosure will be described in detail below with reference to the accompanying drawings and specific implementations.

Embodiment 1

Figure 4:
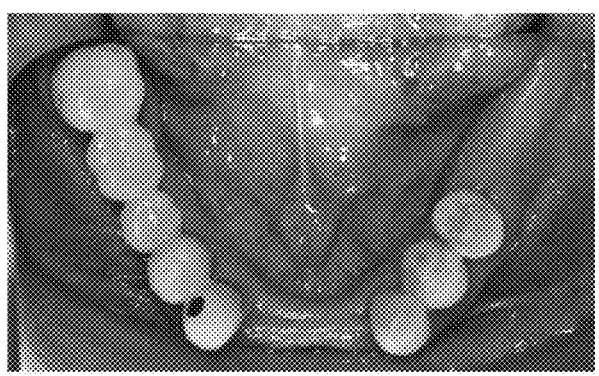
FIG. 4 is a schematic diagram of an oral cavity having an edentulous region according to an embodiment.

According to this embodiment, as illustrated in FIG. 4, a method for constructing a preparation guide plate model for the oral cavity to be repaired is described. The specific method is as follows.

Figure 5:
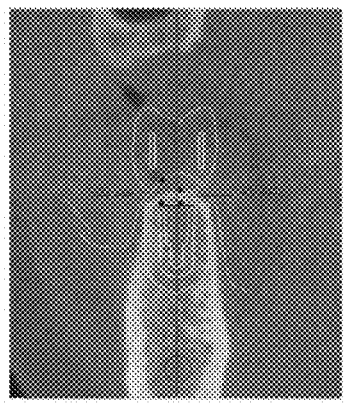
FIG. 5 is CBCT data of FIG. 4, where
Figure 5:
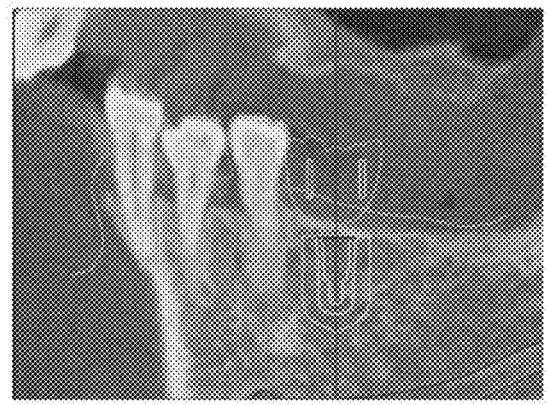

In step 1, performing a cone beam CT scan on the oral cavity illustrated in FIG. 4, to obtain CBCT data illustrated in FIG. 5. The scanned CBCT data is imported into the Simplant software and data analysis is performed on the bone mineral density, the bone height, and the bone width in the edentulous region, to simulate the implant placement, and the implant placement site and the implant placement direction ae determined based on the position of the adjacent tooth and the position of the occlusion tooth.

Figure 6:
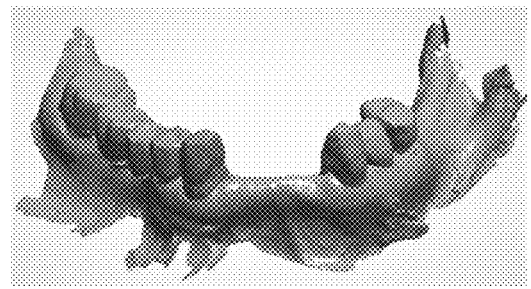
FIG. 6 is oral scan data of FIG. 4.
Figure 7:
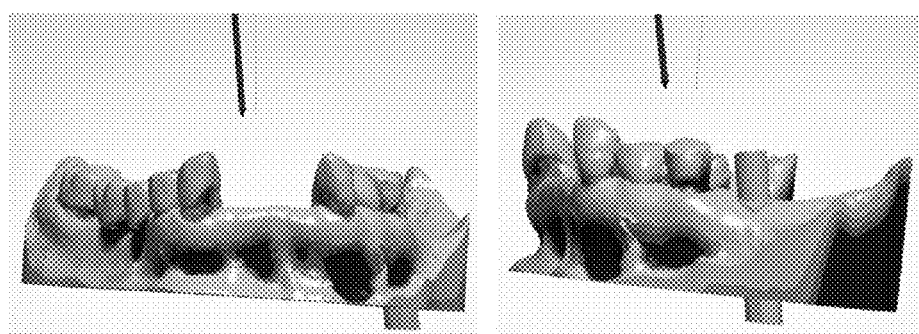
FIG. 7 is data after being subjected to fitting of FIG. 5 and FIG. 6, where

In step 2, an intraoral scan is performed on dentition needing to be repaired, the occlusion tooth, and an occlusal relationship in the oral cavity illustrated in FIG. 4 to obtain the oral scan data (also referred to as the digitized occlusion data) illustrated in FIG. 6, and the oral scan data is imported into 3Shape viewer software. The digitized occlusion data is fitted with CBCT image data that has been processed in step 1, which specifically includes: importing the data of the implant placement site and the implant placement direction determined in the Simplant software into the 3Shape software, and reflecting an implant simulation placement direction and an implant simulation placement position determined in step 1 in the oral scan data, namely, a gray cylindrical object illustrated in FIG. 7 is an implant placement position and the implant placement direction, and adjusting and determining the direction of the insertion path of the removable partial denture (a black arrow) in combination with the implant placement direction, so as to ensure that the implant placement direction is consistent with the direction of the insertion path.

Figure 8:
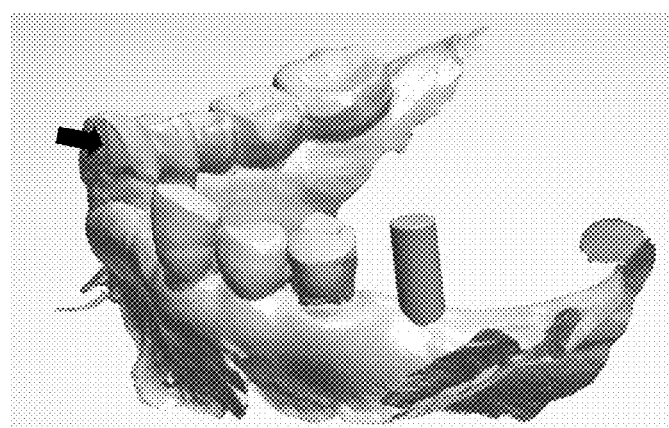
FIG. 8 is a schematic diagram of a guide plane of an inner side of an adjacent tooth in the data illustrated in FIG. 7.

In step 3, in the oral scan data that has been processed in step 2, a plane where the direction of the insertion path is located and which is tangent to an inner side of an adjacent tooth is taken as a reference guide plane, the reference guide plane is translated to a portion close to the inner side of the adjacent tooth and is inserted into the adjacent tooth without changing a direction of the reference guide plane, to form an intersection plane of the reference guide plane and the adjacent tooth, and adjacent tooth local data is stored on a side of the intersection plane close to the edentulous region. The adjacent tooth local data is a region to be removed, and the intersection plane forms a guide plane of the inner side of the adjacent tooth; and when a plurality of adjacent teeth is present, the plurality of adjacent teeth is successively processed to form a corresponding guide plane on an inner side of each of the plurality of adjacent teeth. As illustrated in FIG. 8, the arrow points to the guide plane of the inner side of the adjacent tooth that is formed by removing in the software as above designed.

Figure 9:
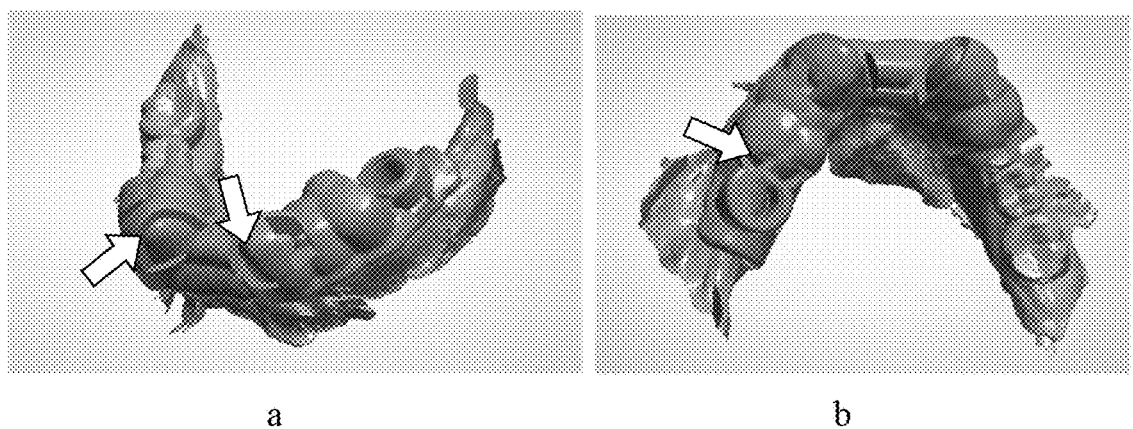
FIG. 9 is a data example of a preparation guide plate model generated according to an embodiment, where
Figure 10:
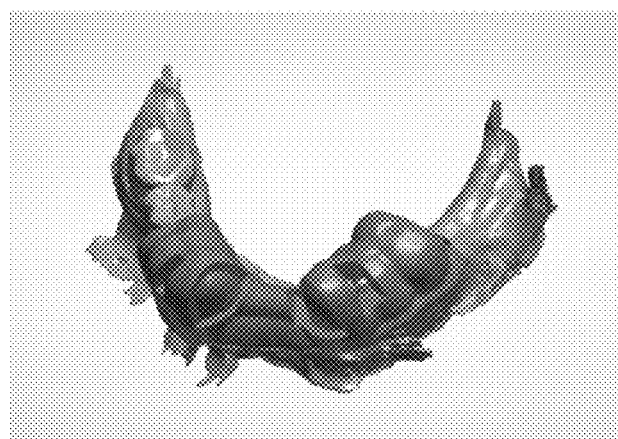
FIG. 10 is a data example of another preparation guide plate model generated according to an embodiment.

In step 4, the preparation guide plate model is generated based on the edentulous region, the adjacent tooth, the guide plane of the inner side of the adjacent tooth, and the region to be removed in the oral scan data that has been processed in step 3, which specifically includes: generating a preparation guide plate including both the implant placement and guide plane preparation in the 3Shape software, and marking a guide plane preparation position with a step-styled sign, to provide a great reference plane for later clinical preparation. FIG. 9 illustrates a preparation guide plate including the guide plane of the inner side of the adjacent tooth and the implant (a white arrow points to the step-styled guidance of the guide plane of the inner side of the adjacent tooth). In other embodiments, in a scheme without the implant, the generated preparation guide plate model is as illustrated in FIG. 10.

Figure 11:
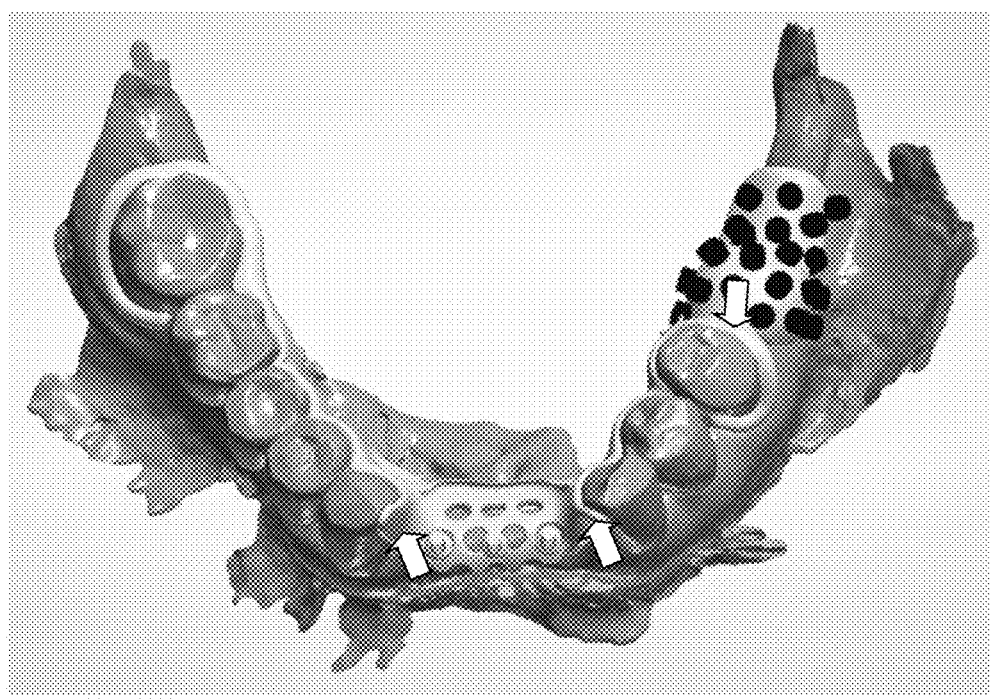
FIG. 11 is a data example of a removable partial denture bracket model generated according to an embodiment.

In step 5, a bracket model illustrated in FIG. 11 is generated in the 3Shape software. As illustrated in FIG. 11, the white arrow points to a structure of the bracket that covers the guide plane of the inner side of the corresponding adjacent tooth.

Embodiment 2

In this embodiment, on the basis of the model constructed in the above embodiment, a 3D printing technology is used to complete fabrication of a titanium-alloy removable partial denture bracket and the preparation guide plate (a printing material of the preparation guide plate in this embodiment is specifically a photosensitive resin), and the removable partial denture is further processed and fabricated on the titanium-alloy removable partial denture bracket.

Clinical use examples of the preparation guide plate and the removable partial denture prepared in the above embodiment are described below.

Figure 12:
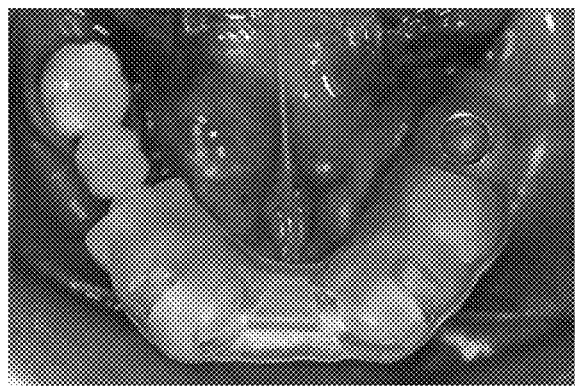
FIG. 12 is an example of a use process of a preparation guide plate of FIG. 11, where.
Figure 12:
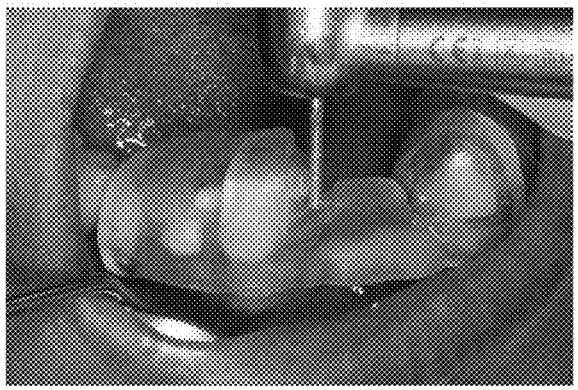
Figure 12:
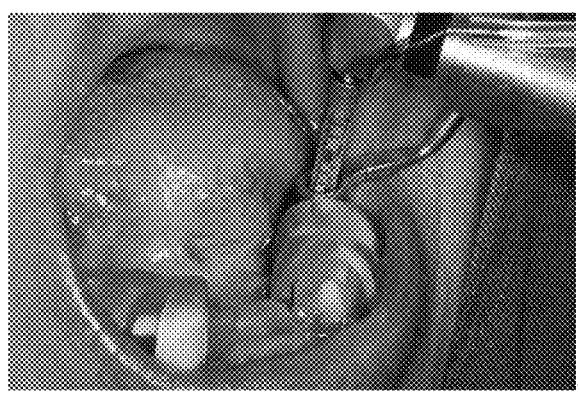
Figure 12:
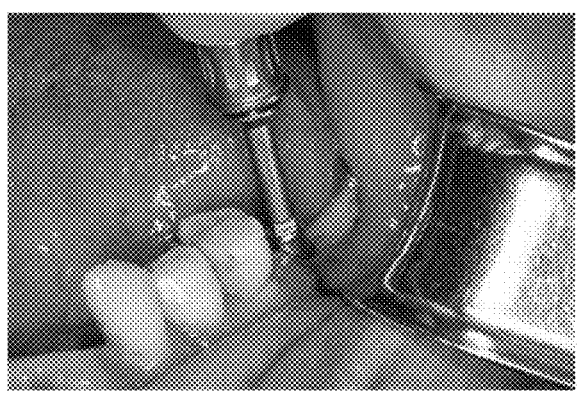
Figure 12:
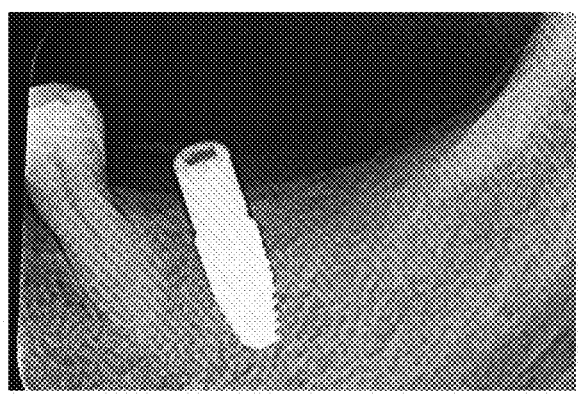
Figure 12:

As illustrated in FIG. 12, the preparation guide plate is put into a mouth of the patient for try-in and confirmation, a high-speed turbine is used to prepare a step (i.e., the guide plane of the inner side of the adjacent tooth) on the guide plate as a reference, and grinding starts at the structure covering the region to be removed until grinding preparation on the guide plane of the inner side of each natural adjacent tooth in the oral cavity is completed.

Further, under guidance of planting holes on the preparation guide plate, whole-course navigation is applied to complete the implant placement. After the implant is placed, on the basis of obtaining good initial stability, the upper abutment (locator, magnet, or snap abutment) is connected to the implant, and the removable partial denture is worn, to achieve the implant placement and synchronous repair of the removable partial denture, and to cover the teeth, thereby realizing a positioning effect during grinding.

In two months, the yin portion of the abutment is mounted in the reserved space for a basal surface of the removable partial denture, and the final repair is achieved by inserting the yin portion into the oral cavity. Moreover, the guide plane on the bracket matches a direction of the guide plane of the inner side of the natural adjacent tooth.

It should be noted that the above-mentioned embodiments are examples of the present disclosure, which does not uniquely define the present disclosure. Any modification, improvement, combination, etc., made by those skilled in the art within the spirit and conception of the present disclosure shall fall within the scope of the present disclosure.

What is claimed is:

1. A method for constructing a preparation guide plate model, the method comprising:

step 1: simulating implant placement in CBCT data of an oral cavity having an edentulous region, and determining an implant placement site and an implant placement direction, to obtain CBCT data including the implant placement site and being marked with the implant placement direction;

step 2: in oral scan data of the oral cavity having the edentulous region, generating a simulated implant and marking a direction of an insertion path for a removable partial denture based on the implant placement site and the implant placement direction that are obtained in step 1, the direction of the insertion path being consistent with the implant placement direction;

step 3: in the oral scan data that has been processed in step 2, taking a plane where the direction of the insertion path is located and which is tangent to an inner side of an adjacent tooth as a reference guide plane, translating the reference guide plane to a portion close to the inner side of the adjacent tooth and inserting the reference guide plane into the adjacent tooth without changing a direction of the reference guide plane, to form an intersection plane of the reference guide plane and the adjacent tooth, wherein adjacent tooth local data is stored on a side of the intersection plane close to the edentulous region, the adjacent tooth local data is a region to be removed, and the intersection plane forms a guide plane of the inner side of the adjacent tooth; and when a plurality of adjacent teeth is present, the plurality of adjacent teeth is successively processed to form a corresponding guide plane on an inner side of each of the plurality of adjacent teeth; and step 4: generating the preparation guide plate model based on the oral scan data that has been processed in step 3, wherein the preparation guide plate model comprises a structure covering the edentulous region and a structure covering the adjacent tooth, wherein a thickness of a structure covering the region to be removed on the structure covering the adjacent tooth is smaller than a thickness of a structure covering a remaining region of the same adjacent tooth, a thickness gap surface between the structure covering the region to be removed and the structure covering the remaining region of the same adjacent tooth covers a local portion of the guide plane of the inner side of the adjacent tooth, and the thickness gap surface is a plane structure having a same direction as a direction of the guide plane of the inner side of the adjacent tooth.

2. The method for constructing the preparation guide plate model according to claim 1, wherein the preparation guide plate model further defines an implant reserve hole, an opening orientation of the implant reserve hole being consistent with the implant placement direction.

3. The method for constructing the preparation guide plate model according to claim 2, wherein an arch-shaped step structure is defined between the structure covering the region to be removed and the structure covering the remaining region of the same adjacent tooth.

4. The method for constructing the preparation guide plate model according to claim 2, wherein the preparation guide plate model comprises 2 to 4 teeth covering one side or two sides of the edentulous region and including the adjacent tooth.

5. The method for constructing the preparation guide plate model according to claim 2, wherein an observation hole is defined in the preparation guide plate model.

6. The method for constructing the preparation guide plate model according to claim 1, wherein an arch-shaped step structure is defined between the structure covering the region to be removed and the structure covering the remaining region of the same adjacent tooth.

7. The method for constructing the preparation guide plate model according to claim 1, wherein the preparation guide plate model comprises 2 to 4 teeth covering one side or two sides of the edentulous region and including the adjacent tooth.

8. The method for constructing the preparation guide plate model according to claim 1, wherein an observation hole is defined in the preparation guide plate model.

9. A method for fabricating a preparation guide plate, the method comprising:
constructing a preparation guide plate model by using the method according to claim 1; and
fabricating the preparation guide plate by using a 3D printing method based on the constructed preparation guide plate model, a material used in the 3D printing method being a resin material.

10. The method for fabricating a preparation guide plate according to claim 9, wherein the preparation guide plate model further defines an implant reserve hole, an opening orientation of the implant reserve hole being consistent with the implant placement direction.

11. A method for constructing a removable partial denture bracket model, used in combination with the preparation guide plate according to claim 1, the method comprising:
generating the removable partial denture bracket model based on the oral scan data that has been processed in step 3 according to claim 1, wherein the removable partial denture bracket model comprises a snap ring attached to a natural tooth and a structure covering the edentulous region and the guide plane of the inner side of the adjacent tooth, and the structure covering the guide plane of the inner side of the adjacent tooth is the plane structure having the same direction as the direction of the guide plane of the inner side of the adjacent tooth as described in step 3.

12. A method for fabricating a removable partial denture bracket, the method comprising:
constructing the removable partial denture bracket model using the method according to claim 11; and
fabricating the removable partial denture bracket by using a 3D printing method based on the constructed removable partial denture bracket model, a material used in the 3D printing method being metal.

* * * * *